US008732390B2

(12) United States Patent
Berman et al.

(10) Patent No.: US 8,732,390 B2
(45) Date of Patent: May 20, 2014

(54) DISTRIBUTION WITH DYNAMIC PARTITIONS

(75) Inventors: Warren Berman, San Jose, CA (US); Paul McParland, Saratoga, CA (US)

(73) Assignee: Seagate Technology LLC, Cupertino, CA (US)

( * ) Notice: Subject to any disclaimer, the term of this patent is extended or adjusted under 35 U.S.C. 154(b) by 282 days.

(21) Appl. No.: 13/149,552

(22) Filed: May 31, 2011

(65) Prior Publication Data

US 2012/0311257 A1     Dec. 6, 2012

(51) Int. Cl.
    *G06F 12/02*     (2006.01)
(52) U.S. Cl.
    USPC ............................................. 711/103; 710/13
(58) Field of Classification Search
    None
    See application file for complete search history.

(56) References Cited

U.S. PATENT DOCUMENTS

| | | | |
|---|---|---|---|
| 2004/0019888 A1 | 1/2004 | Jain et al. | |
| 2004/0268040 A1* | 12/2004 | Bum et al. | 711/115 |
| 2005/0015540 A1 | 1/2005 | Tsai et al. | |
| 2007/0106823 A1* | 5/2007 | Yang et al. | 710/15 |
| 2007/0300287 A1* | 12/2007 | Wynne et al. | 726/2 |
| 2008/0244619 A1* | 10/2008 | Jeon et al. | 719/321 |
| 2010/0033747 A1 | 2/2010 | Kawamura | |
| 2010/0036973 A1* | 2/2010 | Mardiks et al. | 710/13 |
| 2010/0306551 A1 | 12/2010 | Meyer et al. | |

OTHER PUBLICATIONS

"WD SmartWare Utilities for your desktop or portable hard drive"; Western Digital; http://www.wdc.com/wdproducts/updates/?family=wdsmartwareutilitiesmac; Apr. 29, 2010; 3 pages.

* cited by examiner

*Primary Examiner* — Matthew Bradley
*Assistant Examiner* — Daniel Tsui

(57) ABSTRACT

A method and system for specifying at least one read-only partition and at least one read/write partition in a storage device to provide a convenient user experience. Upon initial connection to a computing system, a read-only partition is specified to execute an autorun file. After completion of the autorun file and upon subsequent connections to the computing system, a read/write partition is specified and the read-only partition is invisible to the user.

20 Claims, 11 Drawing Sheets

DISTRIBUTION WITH DYNAMIC PARTITIONS

SUMMARY

Implementations described and claimed herein modify a partition table in a storage device based on two or more alternate non-overlapping partition descriptors. In one implementation, at least one read-only partition and at least one read/write partition are specified in a storage device to provide a convenient user experience. Upon initial connection to a computing system, a read-only partition is specified as a mountable partition of the storage device. As such, the operating system of the computing system executes an autorun file recorded in the read-only partition. After execution of the autorun file and upon subsequent connections to the computing system, a read/write partition is specified as a mountable partition and the read-only partition is unavailable to the user.

These and various other features and advantages will be apparent from a reading of the following detailed description.

BRIEF DESCRIPTIONS OF THE DRAWINGS

DETAILED DESCRIPTIONS

Figure 1:
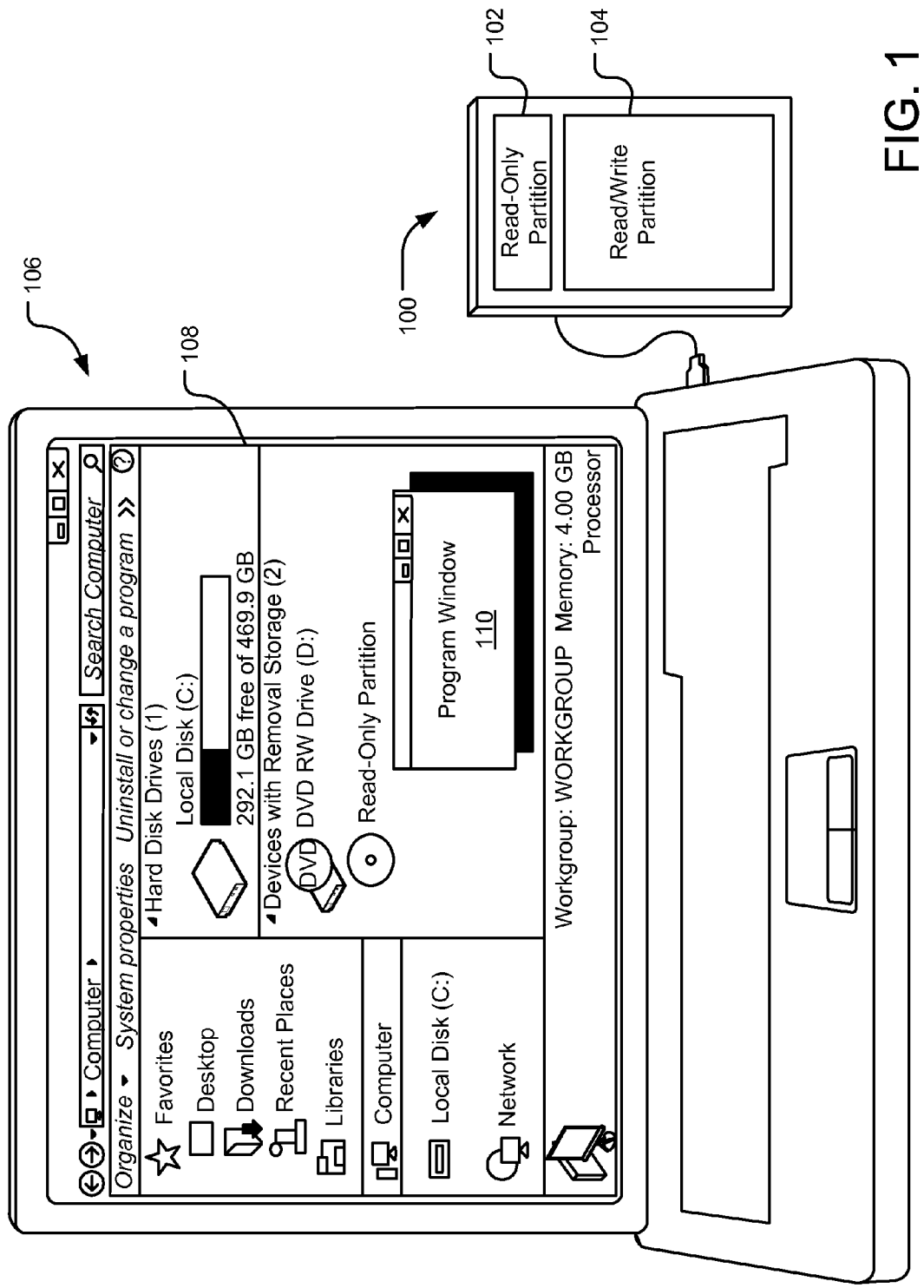
FIG. 1 illustrates an example of a storage device specifying a read-only partition upon connection to a computing system.

A virtual disc represents a logical device that appears as a physical disc drive to the operating system of a computing device. The computing device recognizes a virtual disc as a physical drive because the virtual disc includes a disc image and replaces disc reading hardware using software called a "disc emulator." By virtue of such an emulator, the virtual disc can emulate any type of physical drive or disc, such as a hard drive, CD, DVD, key drive, floppy drive, key drive, or network share. Virtual discs are generally read-only, such that the data of the disc image stored in the virtual disc is not modifiable. Virtual discs may be stored on read-only and/or read/write storage devices, including without limitation hard disc drives (HDD), solid-state drives (SSD), optical drives, magnetic drives, and network attached drives.

Virtual discs can be used for software and/or content distribution. In some such implementations, the virtual disc contains an autorun file including instructions to be executed when the virtual disc is mounted. For example, an autorun file may include instructions for installing in the computing system drivers and configuration software for the storage device. In another example, the autorun file may include instructions for playing content on the computing system. However, some operating systems, such as the Windows 7 Operating System (OS), limit autorun capabilities to read-only devices, disabling autorun functionality for read/write devices to prevent viruses from inadvertently being transferred to the computing system. As such, to execute an autorun file stored in a read/write device, a user is left to browse the read/write device to locate and execute the file, creating an inconvenient user experience.

A storage device having a read-only partition and an alternate read/write partition can avoid this problem because the autorun file can be executed from the virtual disc or read-only partition upon connection to the computing system, but much of the storage device still has read/write capabilities. However, without the technology described herein, when a storage device that contains both a read-only partition and a read/write partition is connected to a computing system, both the read-only partition and the read/write partition are mounted. Because the read-only partition is mounted and includes an autorun file, the user is prompted upon each connection of the storage device to the computing system to execute the autorun file, even if the user had previously executed the software. This unnecessary prompt creates a confusing user experience.

Accordingly, storage devices disclosed herein are equipped with at least one read-only partition (e.g., a virtual disc) and at least one read/write partition. In one implementation, upon initial connection to a computing system, a virtual disc is specified to execute the autorun file. While the virtual disc is specified to the operating system, the read/write partition is not specified and is therefore prevented from mounting, remaining invisible to the user. After the autorun file completes execution, the virtual disc can be automatically unmounted and the read/write partition(s) can then be mounted. Further, upon subsequent connections to the computing system, a read/write partition is specified instead of the virtual disc, thereby rendering the virtual disc invisible to the operating system and the user. If the user desires to re-execute the autorun file, the user may issue a configuration command to specify re-mounting of the virtual disc.

FIG. 1 illustrates an example of a storage device 100 specifying a read-only partition upon initial connection to a computing system. An implementation of the storage device 100 includes a read-only partition 102 and a read/write partition 104. The storage device 100 may include additional read-only partitions and/or read/write partitions. In one implementation, the read-only partition 102 is a virtual disc storing an autorun file. Autorun files may include, for example, executable instructions for installation/configuration of the storage device 100.

A computing system 106 displays a system information window 108, which provides the user with information about the computing system 106, such as information regarding available storage on any hard disc drives, network information, and information about any connected devices with removable storage. In one implementation, when the storage device 100 is connected to the computing system 106 for the first time, firmware in the storage device 100 specifies to the computing system 106 the read-only partition 102 as a mountable partition based on partition table entries in the storage device 100. As such, upon initial connection of the storage device 100 to the computing system 106, the read-only partition 102 is mounted and thus identified in system information window 108 as a device with read-only removable storage available to the user. However, based on the partition table entries, the read/write partition 104 is not specified by the firmware in the storage device 100. As such, the read/write partition 104 is not mounted by the computing system 106 and, therefore, is not identified in the system information window 108 as a device with removable storage available to the user.

The read-only partition 102 shown in FIG. 1 stores an autorun file. When the read-only partition 102 is mounted and identified in the system information window 108 as available to the user, a program window 110 automatically launches, notifying the user that the autorun file stored in the read-only partition 102 is being executed by the computing system 106. The program window 110 may prompt the user for permission to execute the autorun file or may notify the user that the autorun file is automatically being executed without user involvement. After execution of the autorun file, the autorun file communicates to the firmware in the storage device 100 that execution of the autorun file is complete.

Figure 2:
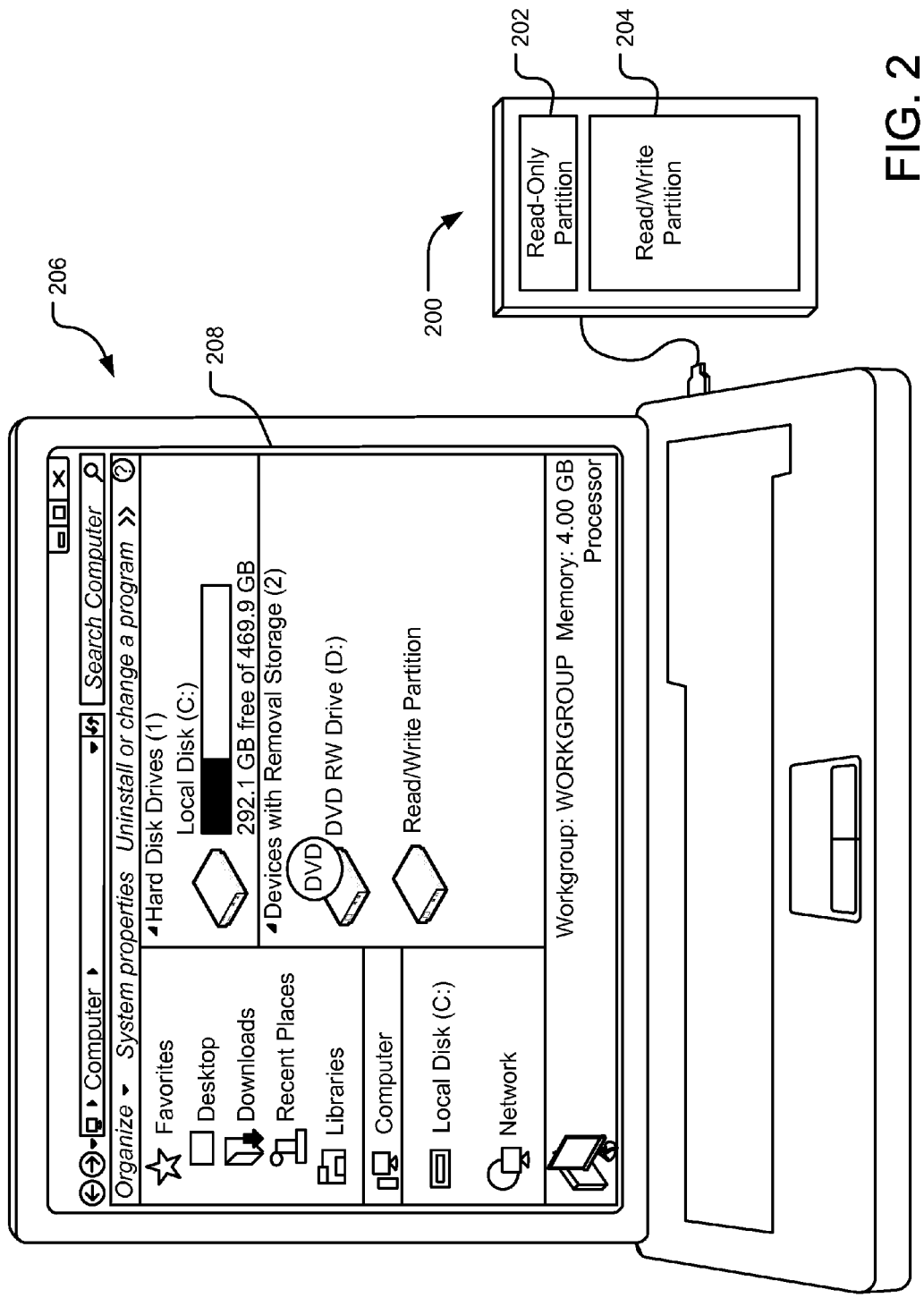
FIG. 2 illustrates an example of a storage device specifying a read/write partition after execution of an autorun file.

FIG. 2 illustrates an example of a storage device 200 specifying a read/write partition after execution of an autorun file. An implementation of the storage device 200 includes a read-only partition 202 and a read/write partition 204. The storage device 200 may include additional read-only partitions and/or read/write partitions. In one implementation, the read-only partition 202 is a virtual disc having an autorun file. Autorun files may include, for example, executable instructions for installation/configuration of the storage device 200.

Computing system 206 displays system information window 208. System information window 208 provides the user with information about computing system 206, such as information regarding available storage on any hard disc drives, network information, and information about any connected devices with removable storage. In one implementation, the autorun file stored in read-only partition 202 has been executed by computing system 206, and the autorun file has communicated to firmware in the storage device 200 that the autorun file is complete. Upon receiving the communication that execution of the autorun file is complete, the firmware in the storage device 200 modifies partition table entries in the storage device 200 to specify the read/write partition 204 as a mountable partition (and not the read-only partition 202) and sends an API message to the computing system 206 to remount a mountable partition of the storage device.

Subsequently, the computing system 206 unmounts the read-only partition 202 and re-enumerates the storage device 200. Upon re-enumeration, the firmware in the storage device 200 specifies the read/write partition 204 as a mountable partition, based on the modified partition table entries in the storage device 200. Thus, the read/write partition 204 is mounted and identified in the system information window 208 as a device with removable storage available to the user. However, based on the modified partition table entries, the read-only partition 202 is no longer specified to the operating system of the computing system 206 by the firmware of the storage device 200.

As a result of these operations, the read-only partition 202 is unmounted and the read/write partition 204 is mounted in its place. Therefore, the read-only partition 202 is not identified in system information window 208 as a device with removable storage available to the user.

Figure 3:
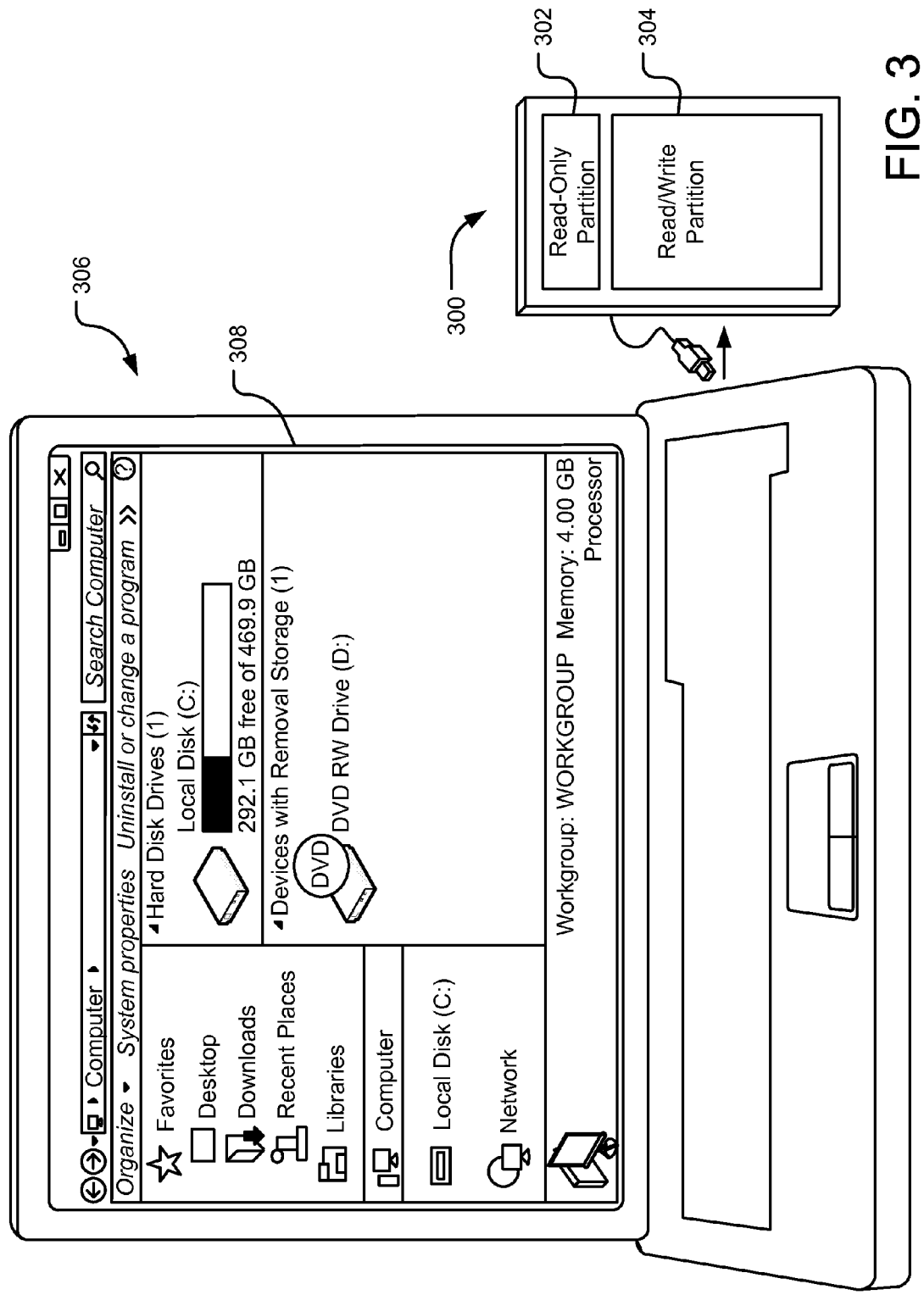
FIG. 3 illustrates an example of a computing system and a storage device after the storage device is disconnected from the computing system.

FIG. 3 illustrates an example of a computing system 306 and a storage device 300 after the storage device 300 is disconnected from the computing system 306. The illustrated implementation of the storage device 300 includes a read-only partition 302 and a read/write partition 304. The storage device 300 may include additional read-only partitions and/or read/write partitions. In one implementation, a read-only partition 302 is a virtual disc having an autorun file. Autorun files may include, for example, executable instructions for installation/configuration of the storage device 300.

The computing system 306 displays a system information window 308, which provides the user with information about the computing system 306, such as information regarding available storage on any hard disc drives, network information, and information about any connected devices with removable storage. Prior to disconnection of the storage device 300, it is assumed that the operations described with regard to FIGS. 1 and 2 are executed, resulting in execution of an autorun file in the read-only partition 302, the subsequent unmounting of the read-only partition 302, and the mounting of the read/write partition 304. In FIG. 3, the storage device 300 is disconnected from the computing system 306, resulting in the unmounting of the read/write partition 304. Accordingly, the system information window 308 shows that no partitions are mounted at the mount point "D:" of the computing system 306.

Figure 4:
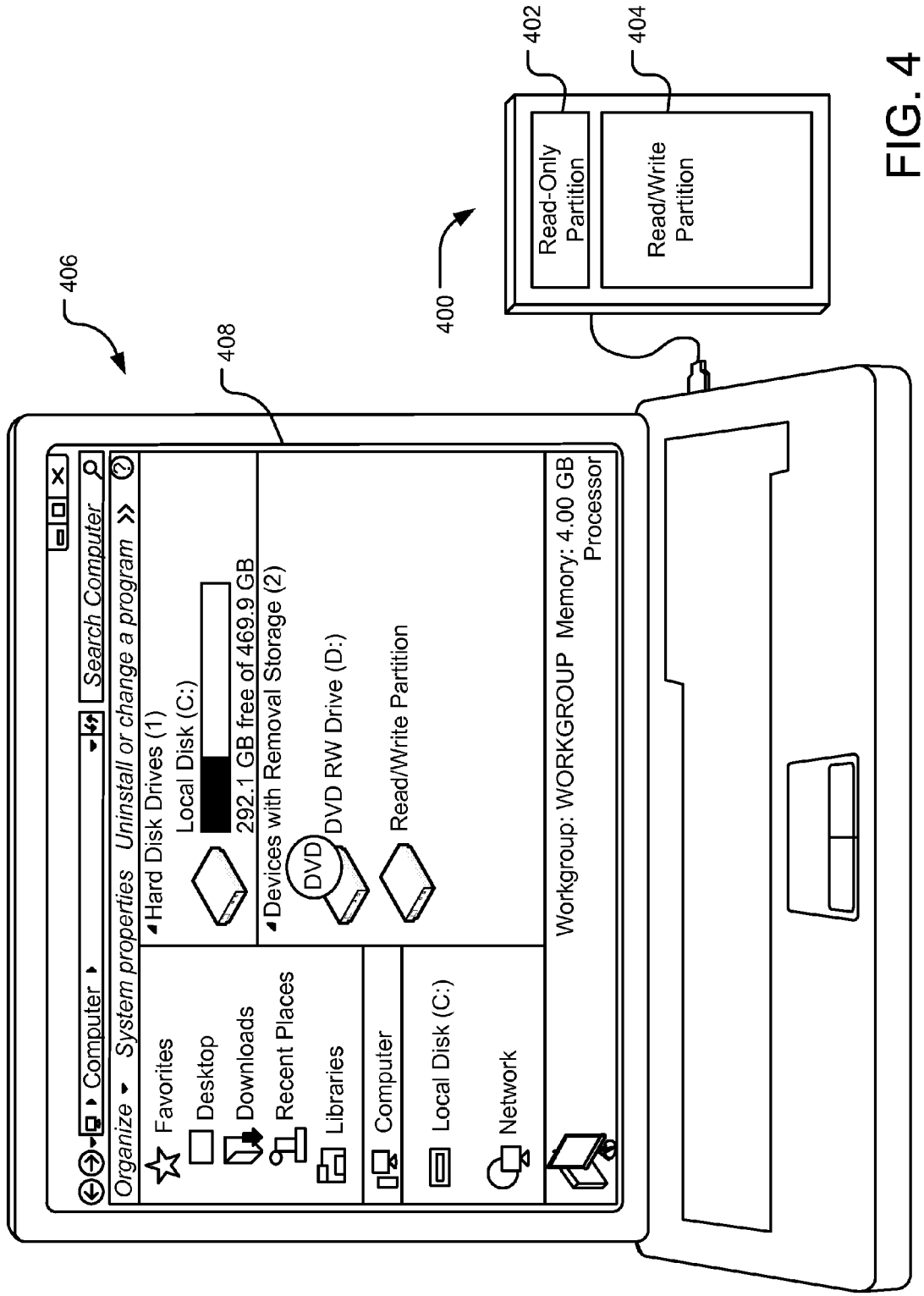
FIG. 4 illustrates an example of a storage device specifying a read/write partition upon subsequent connections to a computing system.

FIG. 4 illustrates an example of a storage device 400 specifying a read/write partition upon subsequent connections to a computing system. An implementation of the storage device 400 includes a read-only partition 402 and a read/write partition 404. The storage device 400 may include additional read-only partitions and/or read/write partitions. In one implementation, the read-only partition 402 is a virtual disc storing an autorun file. Autorun files may include, for example, executable instructions for installation/configuration of the storage device 400.

A computing system 406 displays a system information window 408, which provides a user with information about the computing system 406, such as information regarding available storage on any hard disc drives, network information, and information about any connected devices with removable storage. Prior to reconnection of the storage device 400, it is assumed that the operations described with regard to FIGS. 1, 2, and 3 are executed, resulting in execution of an autorun file in the read-only partition 402, the subsequent unmounting of the read-only partition 402, the mounting of the read/write partition 404, and the disconnection of the storage device 400 from the computing system 406, resulting in the unmounting of the read/write partition 404.

In FIG. 4, the storage device 400 is reconnected to the computing system 406 and the computing system 406 enumerates storage device 400. In one implementation, when the storage device 400 is reconnected to the computing system 406, firmware in the storage device 400 specifies to the computing system 406 the read/write partition 404 as a mountable partition based on partition table entries in the storage device 400. Thus, the read/write partition 404 is mounted and identified in the system information window 408 as a device with read/write removable storage available to the user. However, based on the partition table entries, the read-only partition 402 is not specified by the firmware in the storage device 400. As such, the read-only partition 402 is not mounted by the computing system 406 upon reconnection. Therefore, the read-only partition 402 is not identified in the system information window 408 as a device with removable storage available to the user.

If the user desires to re-execute the autorun file stored in the read-only partition 402, the user may issue a command from the computing system 406 to the firmware in the storage device 400 to specify the read-only partition 402 as a mountable partition. Upon receiving the command to re-execute the autorun file stored in the read/only partition 402, the firmware in the storage device 400 modifies the partition table entries in the storage device 400 to specify the read-only partition 402 as a mountable partition (and not the read/write partition 404) and sends an API message to the computing system 406 to remount a mountable partition of the storage device 400.

Subsequently, the computing system 406 unmounts the read/write partition 404 and re-enumerates the storage device 400. Upon re-enumeration, the firmware in the storage device 400 specifies the read-only partition 402 as a mountable partition, based on the modified partition table entries in the storage device 400. Thus, the read-only partition 402 is mounted and identified in the system information window 408 as a device with removable storage available to the user. However, based on the modified partition table entries, the read/write partition 404 is no longer specified to the operating system of the computing system 406 by the firmware of the storage device 400.

As a result of these operations, the read/write partition 404 is unmounted and the read-only partition 402 is mounted in its place. Therefore, the read/write partition 404 is not identified in the system information window 408 as a device with removable storage available to the user, and the autorun file stored in the read-only partition 402 will automatically re-execute similar to the operations described with respect to FIG. 1.

Figure 5:
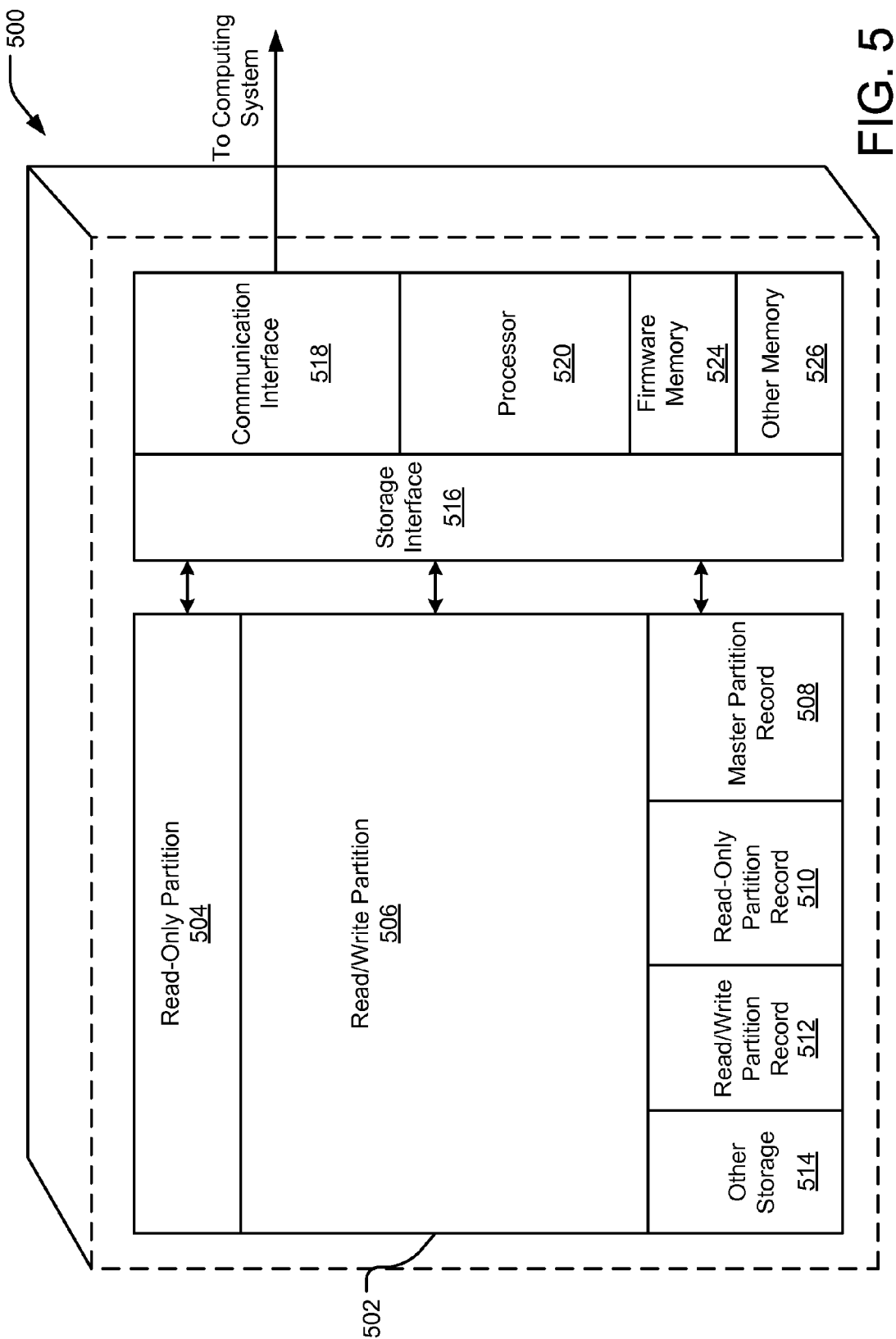
FIG. 5 illustrates an example storage device with dynamic partitions.

FIG. 5 illustrates an example storage device 500 with dynamic partitions. The storage device 500 includes data storage 502, which may embody optical, solid state, magnetic, and/or other storage. The data storage 502 includes a read-only partition 504, a read/write partition 506, a master partition record 508, a read-only partition record 510, a read/write partition record 512, and other storage 514, although other configurations may be employed. In one implementation, the read-only partition 504 is a virtual disc having an autorun file. Autorun files may include, for example, executable instructions for installation/configuration of the storage device 500.

The size of the read-only partition 504 is dynamic such that the partition size is dependent on the parameters of the autorun file stored in the read-only partition 504. Specifically, the size of the read-only partition 504 is configured to meet the individual storage requirements of the autorun file and to maximize the size of the read/write partition 506. When the storage device 500 is initially formatted during the manufacturing process, for example, when firmware memory 524 is loaded into the storage device 500 or when the disc image of the autorun file stored in the read-only partition 504 is attached, the size of the read-only partition 504 may be determined.

The data storage 502 includes the master partition record 508 utilized to maintain the primary partition table of the data storage 502 and to identify the mountable partitions of the data storage 502. The master partition record 508 divides the data storage 502 into partitions based on partition table entries stored in the master partition record 508. As such, the space allocated to the read-only partition 504 and to the read/write partition 506 is configured based on partition table entries stored in the master partition record 508.

The read-only partition record 510 and the read/write partition record 512 are the memory of the data storage 502 stored in the boot record for the read-only partition 504 and the read/write partition 506 respectively. Typically, the boot record embodies the first 512-byte sector of the partitioned storage device 500. Other storage 514 may be utilized to maintain additional partition information or records for the data storage 502. The master partition record 508 identifies the partitions of the data storage 502 by copying, transferring, or otherwise specifying the data stored in the read-only partition record 510 and/or the read/write partition record 512 to the partition table maintained by the master partition record 508. As such, the master partition record 512 may specify the read-only partition 504, the read/write partition 506, or both the read-only partition 504 and the read/write partition 506 based on the partition table entries stored in the master partition record 512. When the partition table in the master partition record 512 is modified to specify the read-only partition 504 or the read/write partition 506, the sizes of the read-only partition 504 and the read/write partition 506 are not changed. As such, the extents of the partitions configured for the storage device 500 are not modified when the partition table in the master partition record 512 is modified based on the non-overlapping partition descriptors specifying the read-only partition 504 and the read/write partition 506.

The storage device 500 is operatively coupled to one or more computing systems (not shown) through a communication interface 518, which may be coupled to the computing system via wired, wireless, or other connection. The computing system may be implemented as various devices configured to communicate with the storage device 500, including without limitation a general purpose computer or special purpose computing device. The communication interface 518 is configured to send communications to and receive communications from the computing system.

In one implementation, the storage device 500 includes a processor 520, such as a central processing unit (CPU), microprocessor, and/or other processing unit. The processor 520 controls the operations of the storage device 500. For example, the processor 520 may be configured to control operations of the storage device 500 according to commands received through the communication interface 518 or executed from the firmware memory 524 or other memory 526. The other memory 526 may be configured to temporarily store information and/or implement instructions received through a storage interface 516 and/or the communication interface 518. The other memory 526 may store data read from the master partition record 508 so that instructions stored in the firmware memory 524 may be executed by the processor 520 to operate on the data.

Instructions stored in firmware memory 524 may be executed by the processor 520 to control the enumeration of the storage device 500 by the computing system, to mount or unmount the storage device 500 from the computing system, and to be responsive to commands or information received through the communication interface 518 and the storage interface 516. Additionally, instructions stored in the firmware memory 524 may be executed by the processor 520 through the storage interface 516 to modify partition table entries stored in the master partition record 508.

In one implementation, the firmware instructions modify the partition table stored in the master partition record 508 based on entries for the read-only partition 504 and the read/write partition 506 without modifying the extents of the partitions configured for the storage device 500. Prior to the first connection of the storage device 500 to the computing system, the partition table stored in the master partition record 508 only contains entries for the read-only partition 504. Upon initial connection of the storage device 500 to the computing system, the firmware instructions receive a request via the communication interface 518 from the computing system to enumerate the storage device 500. The processor 520 executes a command from the firmware instructions via the storage interface 516 to retrieve the partition table entries stored in the master partition record 508. The firmware instructions respond to the enumeration command from the computing system by returning partition descriptors based on the partition table entries received through the storage interface 516. Because the partition table stored in the master partition record 508 only contains entries for the read-only partition 504, the firmware instructions return partition descriptors as read-only to the computing system via the communication interface 518. Thus, only the read-only partition 504 is mounted on the computing system. The read-only partition 504 may be a virtual disc storing an autorun file or program. After the storage device 500 is enumerated as read-only and the read-only partition 504 is mounted, the autorun file stored in the read-only partition 504 is executed by the computing system.

The autorun file notifies the firmware instructions that it has been executed through the communication interface 518. Upon receiving the execution message from the autorun file, the processor 520 executes a command from the firmware instructions through the storage interface 516 to modify the partition table stored in the master partition record 508 to contain only entries for the read/write partition 506. In response to the modification command, the data stored in the read/write partition record 512 is copied, transferred, or otherwise specified to the partition table entries maintained by the master partition record 508, and the partition table entries corresponding to the read-only partition 504 are deleted from the partition table maintained by the master partition record 508. The firmware instructions additionally send an API message to the computing system to unmount and re-enumerate the storage device 500. Upon re-enumeration, the firmware instructions return, to the computing system, partition descriptors based on the partition table entries received through the storage interface 516. Because the partition table stored in the master partition record 508 has been modified to contain entries for the read/write partition 506 only, the firmware instructions return partition descriptors as read/write to the computing system via the communication interface 518. As such, only the read/write partition 506 is mounted on the computing system and now available to a user for use.

If the user desires to re-execute the autorun file, the user may reverse the process by issuing a command from the computing system. When the firmware instructions receive a re-execute command through the communication interface 518, the processor 520 executes a command from the firmware instructions through the storage interface 516 to modify the partition table stored in the master partition record 508 to contain only entries for the read-only partition 504. In response to the modification command, the data stored in the read-only partition record 510 is copied, transferred, or otherwise specified to the partition table entries maintained by the master partition record 508, and the partition table entries corresponding to the read/write partition 506 are deleted from the partition table maintained by the master partition record 508.

Figure 6:
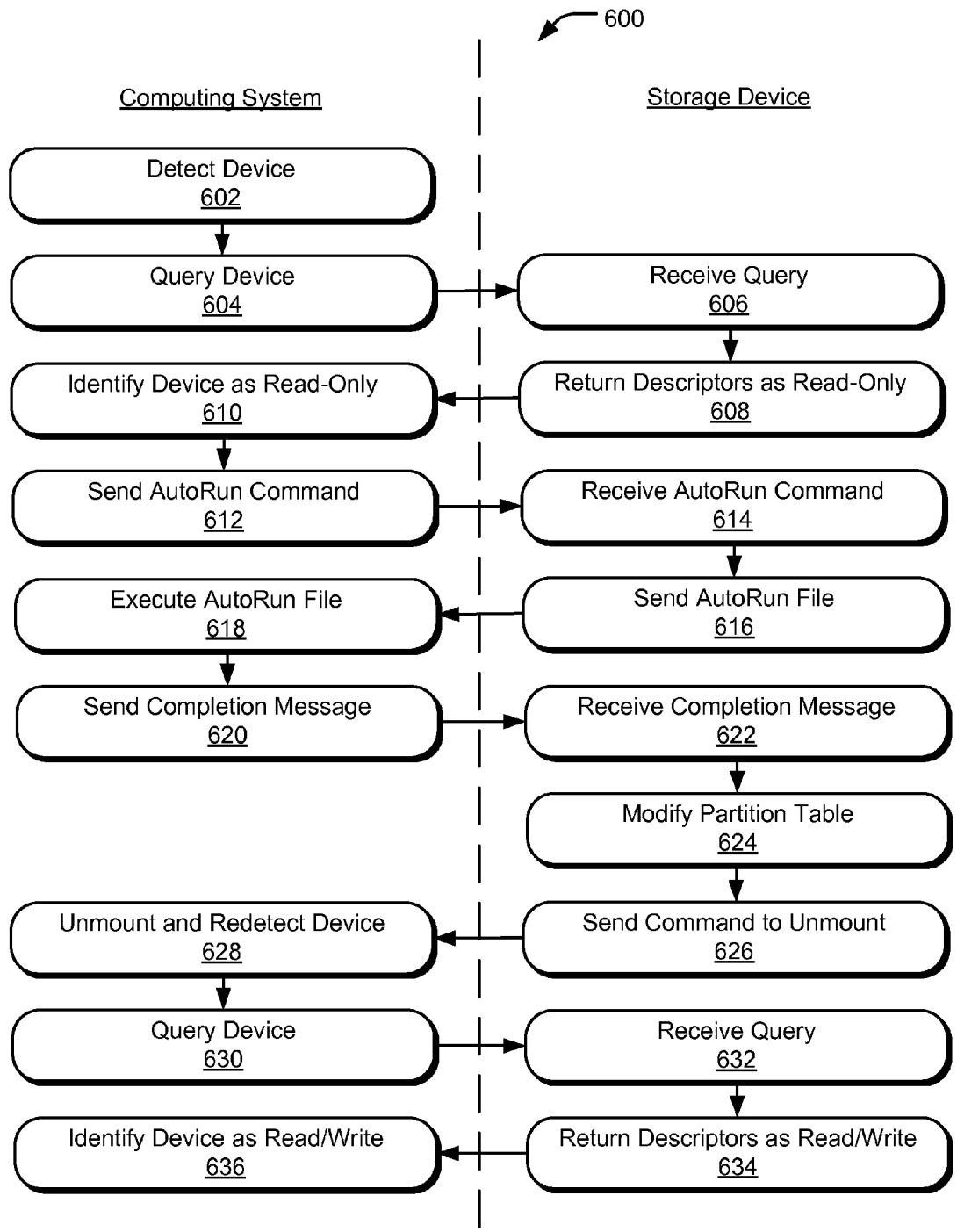
FIG. 6 illustrates example communications between a computing system and a storage device.

FIG. 6 illustrates example communications and operations 600 that are accomplished through interaction between a computing system and a storage device. Upon initial connection of the storage device to the computing system, a detection operation 602 detects and initiates enumeration of the storage device.

Firmware in the storage device includes instructions for various operations that control the enumeration process. To enumerate the storage device, a query operation 604 sends requests from the computing system to the storage device to establish a communications path between the computing system and the storage device and to obtain information necessary to characterize and identify the storage device. The query operation 604 may additionally include requests by the computing system that the storage device take other actions. During a receive operation 606, the storage device receives the requests for information from the computing system. A return operation 608 returns storage device descriptors to the computing system as read-only. The firmware instructions in the storage device specify the storage device descriptors as read-only during the return operation 608 based on partition table entries in the storage device. An identification operation 610 completes the enumeration process. During the identification operation 610, the computing system receives the storage device descriptors. The computing system analyzes the storage device descriptors and determines that the descriptors are read-only. The computing system identifies the storage device as entirely read-only.

After identifying the storage device as read-only, the computing system will perform autorun operations to execute an autorun file, such as executable instructions for installation/configuration of the storage device, from a read-only partition in the storage device. A run operation 612 initiates the autorun operations. In one implementation, the run operation 612 will query a user by sending an autorun prompt to a foreground window of a user interface of the computing system. The user may then select to run the autorun file, and an autorun command is sent to the storage device. In another implementation, the run operation 612 automatically sends an autorun command to the storage device without user involvement. The storage device receives the autorun command from the computing system in the receive operation 614. In response, a sending operation 616 sends the autorun file from the storage device to the computing system for execution. An execution operation 618 receives the autorun file from the storage device and executes the autorun file on the computing system. Such execution may include installation of software, configuration of the storage device, or playing media depending on the content with the autorun file. After the execution of the autorun file, in one implementation, a completion operation 620 automatically sends a message from the autorun file to notify the storage device that the autorun file is finished. In another implementation, the completion operation 620 sends a command manually initiated by a user to remove the storage device from the computing system.

A receive operation 622 receives the message that the autorun file has been executed or that the user has initiated manual removal of the storage device. In response, during a modification operation 624, the firmware instructions in the storage device modify the partition table entries in the storage device to specify a read/write partition in the storage device and to not specify the read-only partition storing the autorun file in the storage device. An unmounting operation 626 commands the computing system to unmount the storage device, specifically the read-only partition of the storage device. A re-detection operation 628 receives the unmount command from the storage device and re-detects and initiates re-enumeration of the storage device.

The firmware in the storage device includes instructions for various operations that control the unmounting and re-enumeration processes. To re-enumerate the storage device, a query operation 630 sends requests from the computing system to the storage device to establish a communications path between the computing system and the storage device and to obtain information necessary to characterize and identify the storage device. A query operation 630 may additionally include requests by the computing system that the storage device take other actions. During a receive operation 632, the storage device receives requests for information from the computing system. A return operation 634 returns storage device descriptors to the computing system as read/write. The firmware instructions specify the storage device descriptors as read/write during the return operation 634 based on partition table entries in the storage device, which were modified to specify the read/write partition during the modification operation 624. An identification operation 636 completes the re-enumeration process. During the identification operation 636, the computing system receives the storage device descriptors. The computing system analyzes the storage device descriptors and determines that the descriptors are read/write. The computing system identifies the storage device as entirely read/write.

Figure 7:
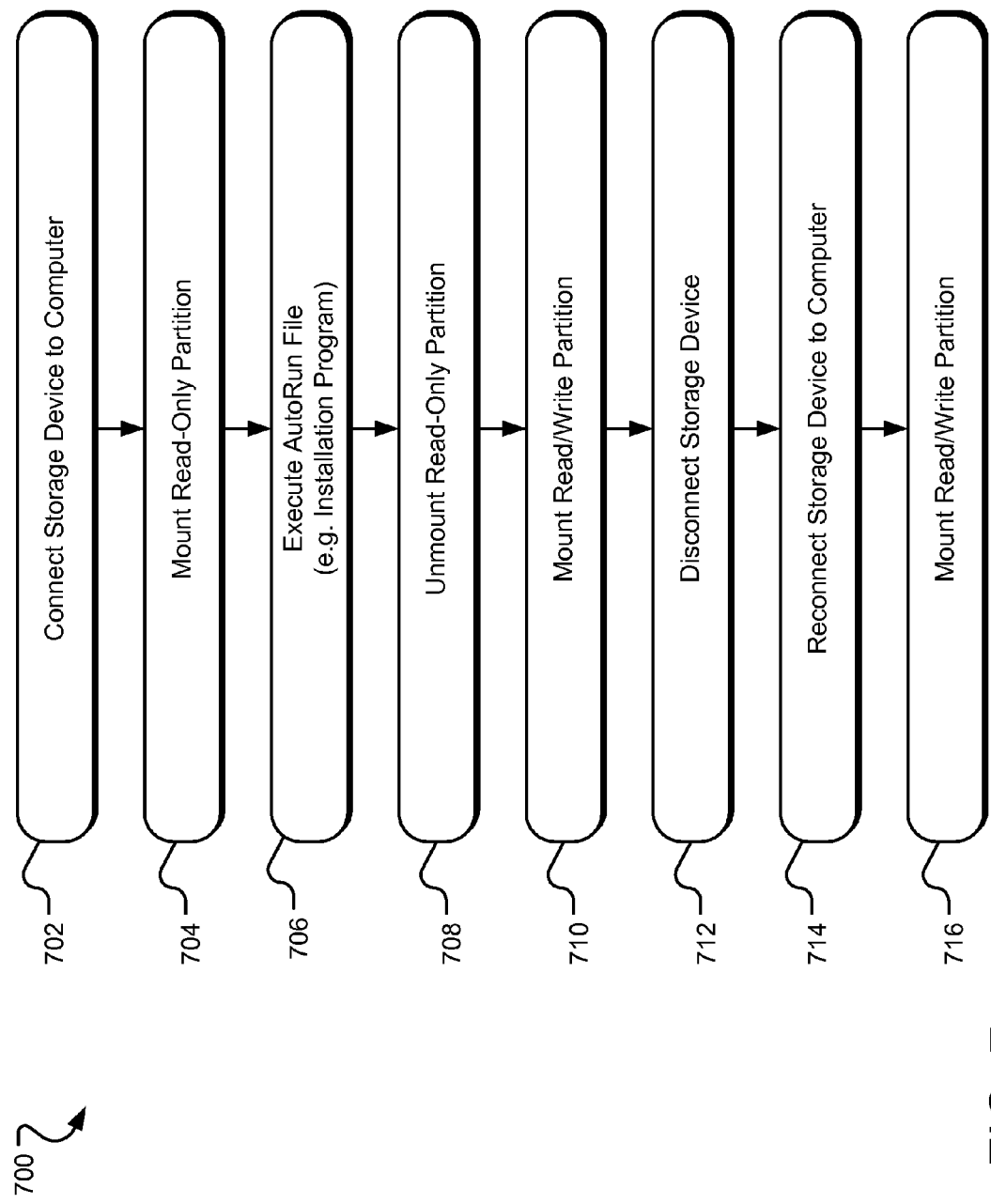
FIG. 7 illustrates example operations for distribution with dynamic partitions from a user's perspective.

FIG. 7 illustrates example operations 700 for distribution with dynamic partitions from a user's perspective. During a connection operation 702, the user connects a storage device to a computing system. For example, the storage device may be connected to a personal computer or laptop via a USB port. The enumeration of the storage device is invisible to the user. After connecting the storage device, a mounting operation 704 mounts a disc image of a read-only device on the computing system. An icon identifying the read-only device appears on a user interface of the computing system.

An execution operation 706 automatically launches an autorun file from the storage device. In one implementation, the execution operation 706 queries the user by sending an autorun prompt to a foreground window of a user interface of the computing system. The user may then select to run the autorun file. In another implementation, the execution operation 706 notifies the user that the autorun file is being automatically executed by computing system. The execution operation 706 may also notify the user upon completion of execution of the autorun file.

After execution of the autorun file is complete, an unmounting operation 708 unmounts the disc image of the read-only device from the computing system. The icon identifying the read-only device disappears from the user interface of the computing system. The re-enumeration process of the storage device is invisible to the user. A mounting operation 710 mounts a disc image of a read/write device on the computing system. An icon identifying the read/write device appears on the user interface of the computing system. However, the icon identifying the read-only device does not re-appear on the user interface of the computing system. Following the mounting operation 710, the storage device is now available to the user as a read/write device.

A disconnection operation 712, a reconnection operation 714, and a mounting operation 716 are optional. During the disconnection operation 712, the user disconnects the storage device from the computing system. To prevent data loss, the disconnection operation 712 unmounts the disc image of the read/write device from the computing system, and the icon identifying the read/write device disappears from the user interface of the computing system. The user then may safely remove the storage device from the computing system. The reconnection operation 714 is similar to the connection operation 702. Specifically, during the reconnection operation 714, the user connects the storage device to the computing system. The mounting operation 716 mounts a disc image of the read/write device on the computing system. An icon identifying the read/write device appears on the user interface of the computing system. Thus, upon reconnection to the computing system, the storage device is available to the user as a read/write device and the read-only disc image does not mount.

Figure 8:
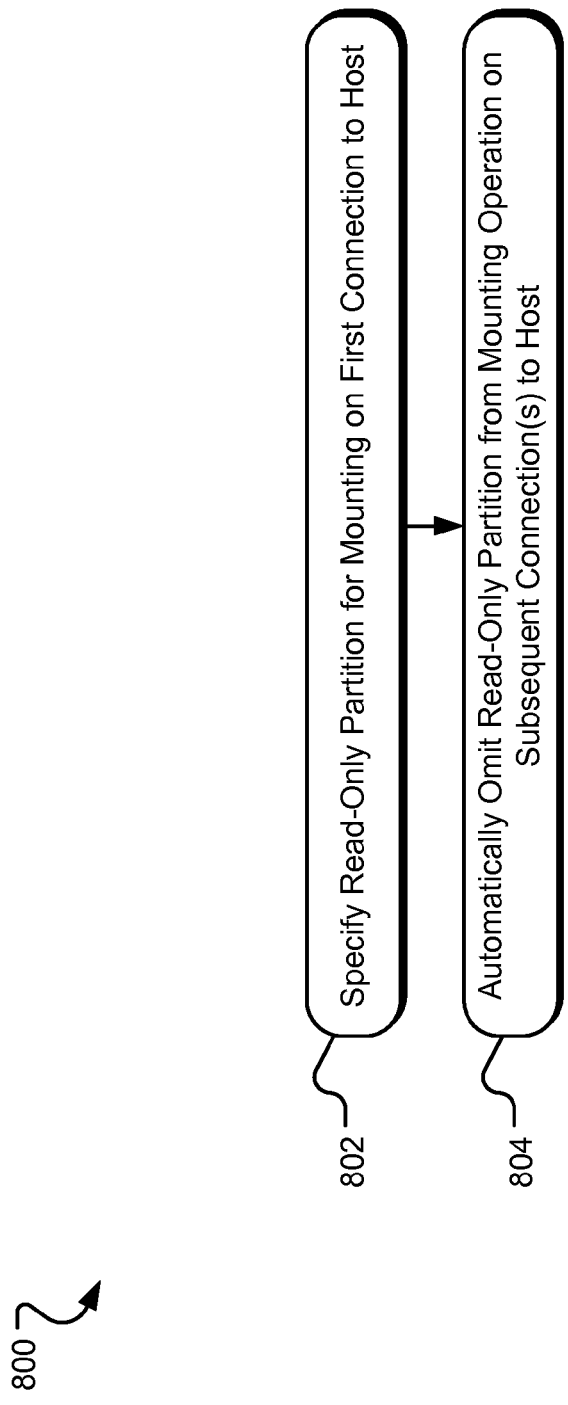
FIG. 8 illustrates example operations for specifying and automatically omitting a read-only partition during mounting operations.

FIG. 8 illustrates example operations 800 for specifying and automatically omitting a read-only partition during mounting operations. During a specify operation 802, a storage device is connected to and enumerated by a host for the first time. For example, the storage device may be connected to a personal computer or laptop via a USB port. Firmware in the storage device includes instructions for various operations that control the mounting process. Upon the first enumeration of the storage device by the host, the specify operation 802 specifies a read-only partition in the storage device for mounting on the host. In an implementation, the firmware instructions in the storage device specify the storage device descriptors as read-only during the specify operation 802 based on partition table entries in the storage device. Based on the specify operation 802, the host identifies the storage device as entirely read-only, and the host mounts a disc image of the read-only partition, such as an emulated virtual CD-ROM. In an implementation, after the read-only partition is mounted on the host, auto execute instructions, such as a configuration program for the storage device, are automatically read from the read-only partition and executed by the host. The configuration program may be, for example, an installation program. After execution of the auto execute instructions by the host, the disc image of the read-only partition is automatically unmounted from the host. The storage device may be disconnected from the host or remain connected for re-enumeration by the host.

During an omit operation 804, the storage device is subsequently re-enumerated with the host. In one implementation, the storage device was disconnected from the host in the specify operation 804, so re-enumeration occurs upon reconnection of the storage device to the host. In another implementation, the storage device was not disconnected from the host in the specify operation 804, and the host re-enumerates the storage device after the read-only partition is unmounted. Upon the subsequent connection to the host, the omit operation 804 automatically omits the read-only partition from a mounting operation on the host (e.g., removes the read-only partition on a subsequent connection to the host, such that the read-only partition is no longer presented as accessible). As such, the read-only partition is not mounted during the omit operation 804. During the omit operation 804, the mounting operation may include specifying a read/write partition in the storage device for mounting on the host. In this case, as a result of the omit operation 804, the host identifies the storage device entirely as read/write because the read-only partition is automatically omitted from the mounting operation. In an implementation, the firmware instructions in the storage device automatically omit the read-only partition from the mounting operation based on partition table entries in the storage device. For example, the read-only partition may be omitted by modifying a master partition record in the storage device to replace one or more partition entries associated with the read-only partition with one or more partition entries associated with the read/write partition. As a result of the omit operation 804, the read-only partition is omitted from the mounting operation on all subsequent enumerations by the host unless a user manually sends a command to the storage device to reverse the process. Upon receipt of the manual command, the firmware instructions again specify the read-only partition for mounting upon connection to the host. Any other partitions, such as the read/write partition, would be omitted from the mounting operation when the read-only partition is specified, and the specify operation 802 and the omit operation 804 would then be repeated.

Figure 9:
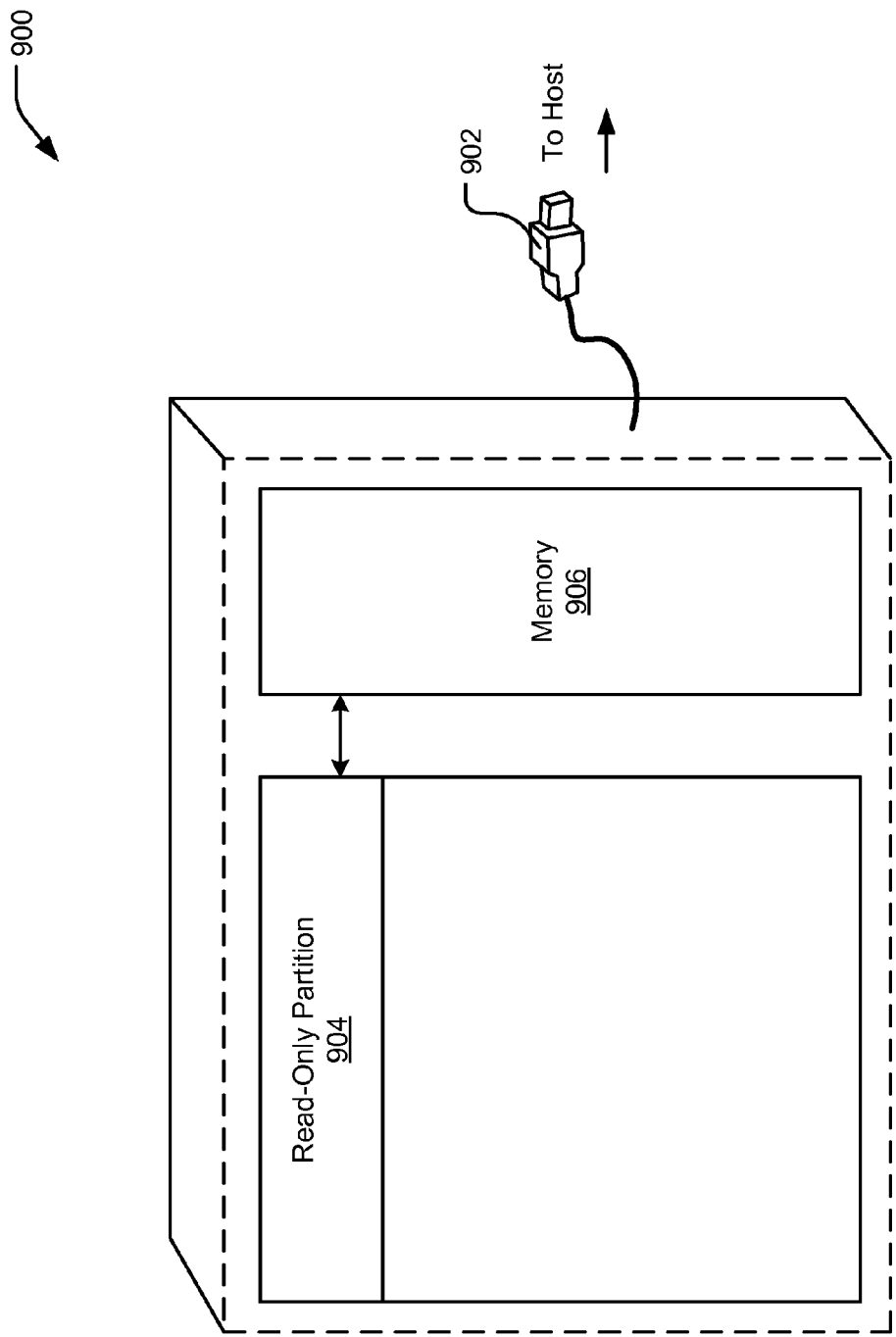
FIG. 9 illustrates an example storage device configured to specify a partition for a mounting operation upon connection to a host.

FIG. 9 illustrates an example storage device 900 configured to specify a partition for a mounting operation upon connection to a host. The storage device 900 is connected to the host (not shown) via a removable connector 902. The removable connector 902 may be, for example, as USB cable. After the storage device 900 is connected to the host via removal connector 902, the host enumerates the storage device 900 for the first time.

The storage device 900 includes a read-only partition 904, which may embody optical, solid state, magnetic, and/or other storage. In one implementation, the read-only partition 904 is a virtual disc, such as an emulated virtual CD-ROM, that stores auto execute instructions that are executable by the host. The auto executable instructions may represent, for example, an installation/configuration program for the storage device 900. The size of the read-only partition 904 is dynamic such that the partition size mirrors the size required to store the auto execute instructions. For example, the read-only partition 904 may be configured to meet the individual storage requirements of the auto execute instructions and to maximize the main storage capacity of the storage device 900.

Memory 906 stores firmware instructions. Instructions stored in firmware memory 906 may be executed by a processor, such as a central processing unit (CPU), microprocessor, and/or other processing unit.

In an implementation, the memory 906 stores instructions for specifying a partition in the storage device 900 for a mounting operation during enumeration of the storage device 900 by the host. Upon the first connection of the storage device 900 to the host, the firmware instructions specify the read-only partition 904 for the mounting operation. In an implementation, the firmware instructions specify the storage device 900 descriptors as read-only based on partition table entries in the storage device 900. From these descriptors, the host identifies the storage device 900 as entirely read-only, and the host mounts a disc image of the read-only partition 904 on the host. In an implementation, after the read-only partition 904 is mounted on the host, auto execute instructions, such as a configuration program for the storage device 900, are automatically executed by the host. The configuration program may be, for example, an installation program. In response to the execution of the auto execute instructions read from the read-only partition 904, the disc image of the read-only partition 904 is automatically unmounted from the host. The storage device 900 may be disconnected from the host or remain connected for re-enumeration by the host.

The storage device 900 is subsequently re-enumerated by the host after the read-only partition 904 is unmounted. In one implementation, the storage device 900 was disconnected from the host, so subsequent re-enumeration occurs upon reconnection of the storage device 900 to the host. In another implementation, the storage device 900 was not disconnected from the host, and the host re-enumerates the storage device 900 after the read-only partition 904 is unmounted. Upon the subsequent connection to the host, the firmware instructions automatically omit the read-only partition 904 from the mounting operation on the host. As such, the read-only partition 904 is not mounted, but other partitions in storage device 900 may be mounted in the mounting operation. For example, the mounting operation may include specifying a read/write partition in the storage device for mounting on the host. In this case, the host identifies the storage device 900 entirely as read/write because the read-only partition 904 is automatically omitted from the mounting operation. In an implementation, the firmware instructions automatically omit the read-only partition 904 from the mounting operation based on partition table entries in the storage device 900. For example, the read-only partition 904 may be omitted by modifying a master partition record in the storage device 900 to replace one or more partition entries associated with the read-only partition 904 with one or more partition entries associated with the read/write partition. As a result, the read-only partition 904 is omitted from the mounting operation on all subsequent connections to and enumerations by the host unless a user manually sends a command to the storage device 900 to reverse the process. Upon receipt of the manual command, the firmware instructions again specify the read-only partition 904 for mounting upon connection to the host. Any other partitions, such as the read/write partition, would be omitted from the mounting operation when the read-only partition 904 is specified.

Figure 10:
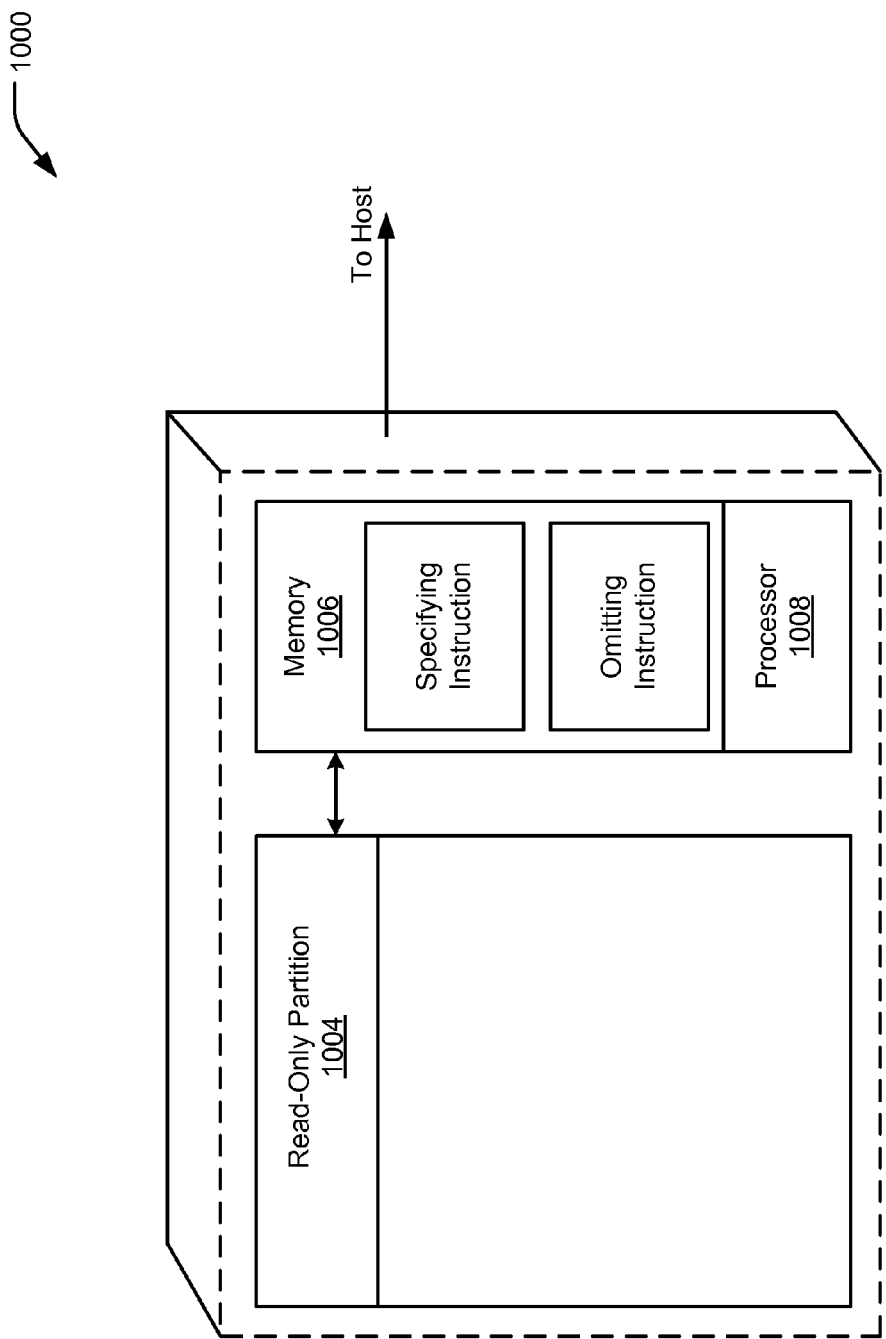
FIG. 10 illustrates an example processor-readable storage medium encoding a processor executable program for executing a process for specifying and automatically omitting a read-only partition during mounting operations.

FIG. 10 illustrates an example processor-readable storage medium 1000 encoding a processor executable program for executing a process for specifying and automatically omitting a read-only partition during mounting operations. The storage medium 1000 is operatively coupled to one or more hosts (not shown), and the storage medium 1000 may be coupled to the host via wired, wireless, or other connection. The host may be implemented as various devices configured to communicate with the storage medium 1000, including without limitation a general purpose computer or special purpose computing device.

The storage medium 1000 includes a read-only partition 1004, which may embody optical, solid state, magnetic, and/or other storage. In one implementation, the read-only partition 1004 is a virtual disc, such as an emulated virtual CD-ROM, that stores auto execute instructions that are executable by the host. The auto executable instructions may represent, for example, a configuration program for the storage device 1000. The configuration program may be, for example, an installation program. The size of the read-only partition 1004 is dynamic such that the partition size mirrors the size required to store the auto execute instructions. For example, the read-only partition 1004 may be configured to meet the individual storage requirements of the auto execute instructions and to maximize the main storage capacity of the storage device 1000.

Memory 1006 stores firmware instructions, including, without limitation, specifying and omitting instructions. Instructions stored in firmware memory 1006 may be executed by a processor 1008, such as a central processing unit (CPU), microprocessor, and/or other processing unit.

In an implementation, the memory 1006 stores instructions for specifying a partition in the storage device 1000 for a mounting operation upon enumeration of the storage device 1000 by the host. Upon the first enumeration of the storage device 1000 by the host, the firmware instructions specify the read-only partition 1004 for mounting on the host. In an implementation, the firmware instructions specify the storage device 1000 descriptors as read-only based on partition table entries in the storage device 1000. From these descriptors, the host identifies the storage device 1000 as entirely read-only, and the host mounts a disc image of the read-only partition 1004 on the host. In an implementation, after the read-only partition 1004 is mounted on the host, auto execute instructions, such as an installation/configuration program for the storage device 1000, are automatically executed by the host. After the execution of the auto execute instructions by the host, the disc image of the read-only partition 1004 is automatically unmounted from the host. The storage device 1000 may be disconnected from the host or remain connected for re-enumeration by the host.

The storage device 1000 is subsequently enumerated by the host after the read-only partition 1004 is unmounted. In one implementation, the storage device 1000 was disconnected from the host, so subsequent enumeration occurs upon reconnection of the storage device 1000 to the host. In another implementation, the storage device 1000 was not disconnected from the host, and the host re-enumerates the storage device 1000 after the read-only partition 1004 is unmounted. Upon the subsequent connection to the host, the firmware instructions automatically omit the read-only partition 1004 from the mounting operation on the host. As such, the read-only partition 1004 is not mounted, but other partitions in storage device 1000 may be mounted in the mounting operation. For example, the mounting operation may include specifying a read/write partition in the storage device for mounting on the host. In this case, the host identifies the storage device 1000 entirely as read/write because the read-only partition 1004 is automatically omitted from the mounting operation. In an implementation, the firmware instructions automatically omit the read-only partition 1004 from the mounting operation based on partition table entries in the storage device 1000. For example, the read-only partition 1004 may be omitted by modifying a master partition record in the storage device 1000 to replace one or more partition entries associated with the read-only partition 1004 with one or more partition entries associated with the read/write partition. As a result, the read-only partition 1004 is omitted from the mounting operation on all subsequent enumerations by to the host unless a user manually sends a command to the storage device 1000 to reverse the process. Upon receipt of the manual command, the firmware instructions again specify the read-only partition 1004 for mounting upon connection to the host. Any other partitions, such as the read/write partition, would be omitted from the mounting operation when the read-only partition 1004 is specified.

Figure 11:
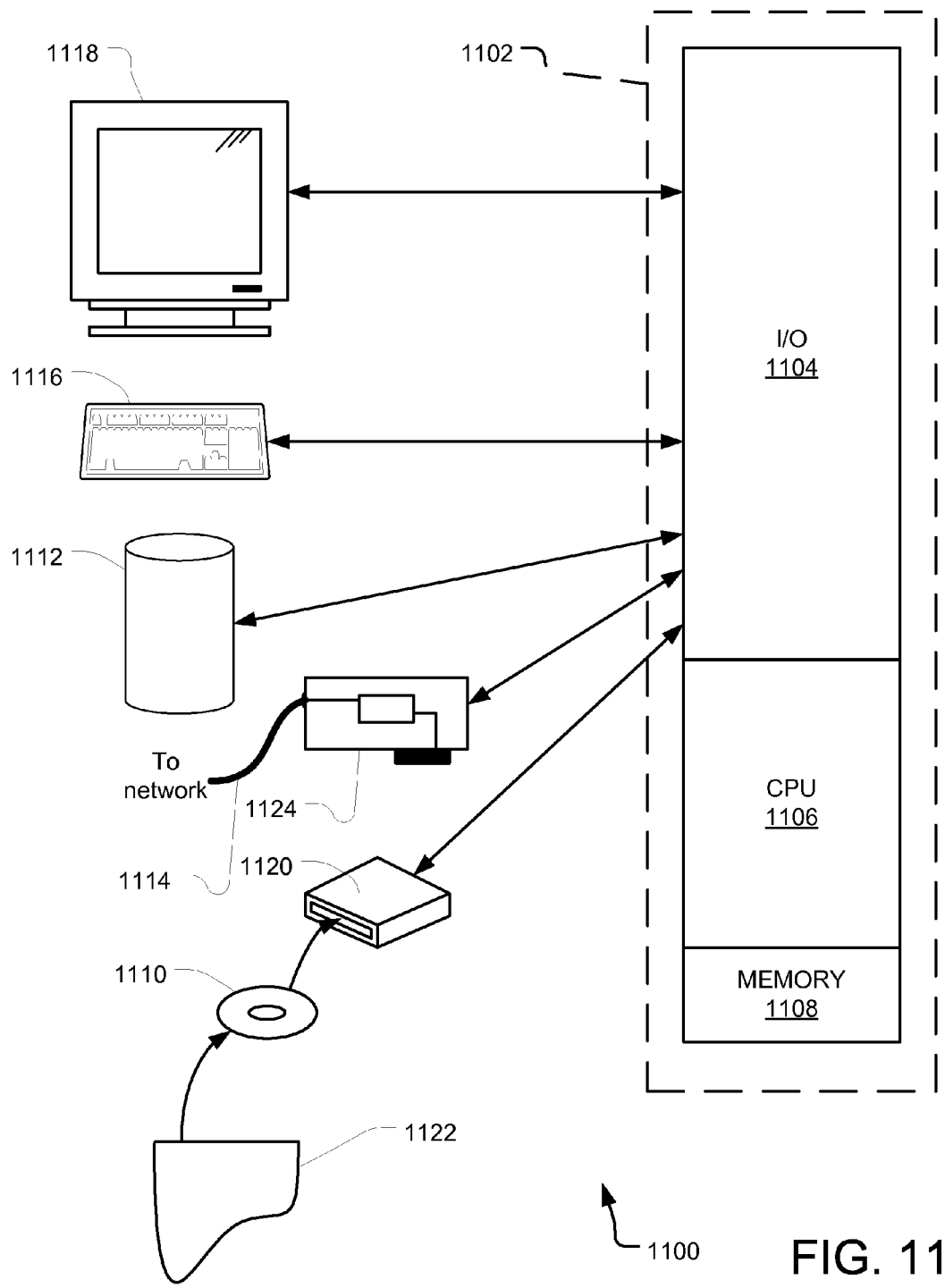
FIG. 11 illustrates an example computing system that may be useful in implementing the presently disclosed technology.

FIG. 11 illustrates an example computing system that may be useful in implementing the presently disclosed technology. A general purpose computer system 1100 is capable of executing a computer program product to execute a computer process. Data and program files may be input to the computer system 1100, which reads the files and executes the programs therein. Some of the elements of a general purpose computer system 1100 are shown in FIG. 11 wherein a processor 1102 is shown having an input/output (I/O) section 1104, a Central Processing Unit (CPU) 1106, and a memory section 1108. There may be one or more processors 1102, such that the processor 1102 of the computer system 1100 comprises a single central-processing unit 1106, or a plurality of processing units, commonly referred to as a parallel processing environment. The computer system 1100 may be a conventional computer, a distributed computer, or any other type of computer. The described technology is optionally implemented in software devices loaded in memory 1108, stored on a configured DVD/CD-ROM 1110 or storage unit 1112, and/or communicated via a wired or wireless network link 1114 on a carrier signal, thereby transforming the computer system 1100 in FIG. 11 to a special purpose machine for implementing the described operations.

The I/O section 1104 is connected to one or more user-interface devices (e.g., a keyboard 1116 and a display unit 1118), a disc storage unit 1112, and a disc drive unit 1120. Generally, in contemporary systems, the disc drive unit 1120 is a DVD/CD-ROM drive unit capable of reading the DVD/CD-ROM medium 1110, which typically contains programs and data 1122. Computer program products containing mechanisms to effectuate the systems and methods in accordance with the described technology may reside in the memory section 1104, on a disc storage unit 1112, or on the DVD/CD-ROM medium 1110 of such a system 1100. Alternatively, a disc drive unit 1120 may be replaced or supplemented by a floppy drive unit, a tape drive unit, or other storage medium drive unit. The network adapter 1124 is capable of connecting the computer system 1100 to a network via the network link 1114, through which the computer system can receive instructions and data embodied in a carrier wave. Examples of such systems include personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 1100 is connected (by wired connection or wirelessly) to a local network through the network interface or adapter 1124, which is one type of communications device. When used in a WAN-networking environment, the computer system 1100 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are examples and other means of and communications devices for establishing a communications link between the computers may be used.

In an example implementation, installation/configuration software and other modules and services may be embodied by instructions stored on the DVD/CD-ROM medium 1110, and/or the storage unit 1112 and executed by the processor 1102. Further, local computing systems, remote data sources and/or services, and other associated logic represent firmware, hardware, and/or software configured to provide dynamic partition functionality for network-connected systems. Such services may be implemented using a general purpose computer and specialized software (such as a server executing service software), a special purpose computing system and specialized software (such as a mobile device or network appliance executing service software), or other computing configurations. In addition, program data, such as storage device configuration data, data read from and written to a storage device, and other data may be stored in the memory 1108, the DVD/CD-ROM medium 1110, and/or the storage unit 1112 and executed by the processor 1102.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or a specific order is inherently necessitated by the claim language. Furthermore, one of more portions of the various processes disclosed above may be implemented by software, hardware, firmware or combination thereof.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
   connecting a storage device containing a software installation file on a read-only partition of the storage device to a host;
   installing application software on the host using the software installation file;
   modifying a partition record to remove a reference to the read-only partition so that the read-only partition is automatically omitted from a mounting operation performed on each of multiple subsequent connections to the host.

2. The method of claim 1, wherein the connecting operation comprises presenting the read-only partition as an emulated virtual CD-ROM to the host.

3. The method of claim 1, wherein the modification operation is performed by a switch module in firmware or software of the storage device.

4. The method of claim 1, wherein the read-only partition is specified for mounting, responsive to the connecting operation.

5. The method of claim 1, wherein the read-only partition has a volume that is small compared to a read-write partition volume of the storage device, the read-only partition storing the software installation file, wherein the software installation file, when executed, causes the read-write partition of the storage device to be mounted on the multiple subsequent connections.

6. The method of claim 1 further comprising:
   reversing the modification operation upon receipt of a user command, wherein the reversing operation causes the read-only partition to be mounted in another subsequent connection.

7. The method of claim 1, wherein the storage device is an external removable hard disk drive or a solid state drive.

8. The method of claim 1, wherein the read-only partition is not mounted as accessible in the at least one subsequent connection.

9. The method claim 1, wherein modifying the partition record further comprises modifying the partition record without user input.

10. A storage device comprising:
    a removable connector to connect the storage device to a host; and
    memory storing firmware instructions to modify a partition record entry upon a first physical connection between the storage device and a host, wherein the firmware instructions modify the partition record entry to remove a reference to a read-only partition so that the read-only partition is automatically omitted from a mounting operation upon a subsequent physical connection between the storage device and the host.

11. The storage device of claim 10, wherein an auto-run file associated with the read-only partition is automatically executed on the first physical connection and not executed on a subsequent connection.

12. The storage device of claim 10, wherein storage device is an external removable hard disk drive.

13. The storage device of claim 10, wherein instructions read from the read-only partition are auto execute instructions that are executable by the host.

14. The storage device of claim 13, wherein the size of the read-only partition mirrors a size required to store the auto execute instructions.

15. A processor-readable storage medium that is not a carrier wave, the processor-readable storage medium encoding a processor executable program for executing a process, the process comprising:
    specifying a read-only partition in a storage device for mounting upon a first enumeration of the storage medium by a host; and
    modifying a master partition record to remove a reference to the read-only partition so that the read-only partition is automatically omitted from a mounting operation on each subsequent enumeration of the storage medium by the host until the host receives a user command specifying the read-only partition as a mountable partition.

16. The process of claim 15, wherein the modifying operation further comprises modifying a master partition record in the storage medium to replace one or more partition entries associated with the read-only partition with one or more partition entries associated with a read/write partition in the storage medium.

17. The process of claim 16, wherein the master partition record is modified after execution, by the host, of auto execute instructions stored in the read-only partition.

18. The process of claim 15, wherein the read-only partition stores auto execute instructions that are executable by a processor of the host.

19. The process of claim 18, wherein the auto execute instructions represent a configuration program for the storage device.

20. The process of claim 15, wherein each of the subsequent enumerations of the storage medium by the host occurs upon a re-connection of the storage medium to the host.

* * * * *